(12) United States Patent
Lynn et al.

(10) Patent No.: US 6,382,657 B1
(45) Date of Patent: May 7, 2002

(54) TRAILER DECOUPLING PREVENTION DEVICE

(75) Inventors: Charles M. Lynn, Ames; Leroy W. Crawford, Watonga; John S. Sheffield, Ames, all of OK (US)

(73) Assignee: BTH, L.L.C., Enid, OK (US)

( * ) Notice: Subject to any disclaimer, the term of this patent is extended or adjusted under 35 U.S.C. 154(b) by 0 days.

(21) Appl. No.: 09/735,844

(22) Filed: Dec. 13, 2000

Related U.S. Application Data

(63) Continuation of application No. 09/186,299, filed on Nov. 4, 1998, now abandoned.

(51) Int. Cl.[7] .................................................. B06D 1/28
(52) U.S. Cl. ...................................... 280/507; 280/457
(58) Field of Search ................................ 280/504, 506, 280/507, 432, 457

(56) References Cited

U.S. PATENT DOCUMENTS

| | | | |
|---|---|---|---|
| 342,730 A | 5/1886 | Carr | |
| 366,671 A | 7/1887 | Petrie | |
| 382,611 A | 5/1888 | Howe | |
| 651,091 A | 6/1900 | Williams | |
| 872,499 A | 12/1907 | Copper | |
| 1,224,744 A | 5/1917 | Holcom | |
| 2,088,991 A | 8/1937 | Berchtold | |
| 2,614,861 A | 10/1952 | Van Horn | |
| 2,650,101 A | 8/1953 | Frankfother | |
| 2,788,990 A | 4/1957 | Barcafer | |
| 2,815,225 A | 12/1957 | Barcafer | |
| 2,834,611 A | * 5/1958 | Chenette | |
| 2,998,982 A | 9/1961 | Brazil | |
| 3,123,383 A | 3/1964 | Humpal | |
| 3,125,355 A | 3/1964 | Snuggins | |
| 3,265,407 A | 8/1966 | Paddock | |
| 3,289,258 A | 12/1966 | Eriksson | |
| 3,341,226 A | 9/1967 | Broun | |
| 3,400,948 A | 9/1968 | Matson | |
| 3,471,170 A | 10/1969 | Rendessy | |
| 3,549,173 A | 12/1970 | Stanfield | |
| 3,605,457 A | * 9/1971 | Foster | |
| 3,770,298 A | 11/1973 | Phillips | |
| 3,827,722 A | 8/1974 | Miller et al. | |
| 3,900,214 A | 8/1975 | Brockelsby | |
| 4,082,311 A | * 4/1978 | Hamman | 280/507 |
| 4,428,596 A | 1/1984 | Bell et al. | |
| 4,774,823 A | * 10/1988 | Callison | 70/14 |
| 5,947,504 A | * 9/1999 | Milazzo | 280/457 |
| 6,155,587 A | * 12/2000 | Milazzo | 280/457 |
| 6,199,891 B1 | * 3/2001 | Bell et al. | 280/207 |
| 6,244,614 B1 | * 6/2001 | Bonvillain et al. | 280/507 |

* cited by examiner

*Primary Examiner*—Avraham H. Lerner
(74) *Attorney, Agent, or Firm*—Dunlap, Codding & Rogers, P.C.

(57) ABSTRACT

A trailer decoupling prevention device for preventing the trailer from decoupling from a trailer hitch mounted on a towing vehicle. The trailer decoupling prevention device comprises a bracket, and a connector assembly to connect the bracket to the trailer. A lower plate is movably supported by the bracket. A lower plate stop assembly is provided for selectively permitting movement of the lower plate between a coupled position and an uncoupled position. In the coupled position, at least a portion of the lower plate is positioned to prevent the trailer from being removed from the trailer hitch. In the uncoupled position, the lower plate is positioned to permit removal of the trailer from the trailer hitch. A unique coupling member for selectively coupling a flexible linkage to an attachment member is also disclosed.

2 Claims, 11 Drawing Sheets

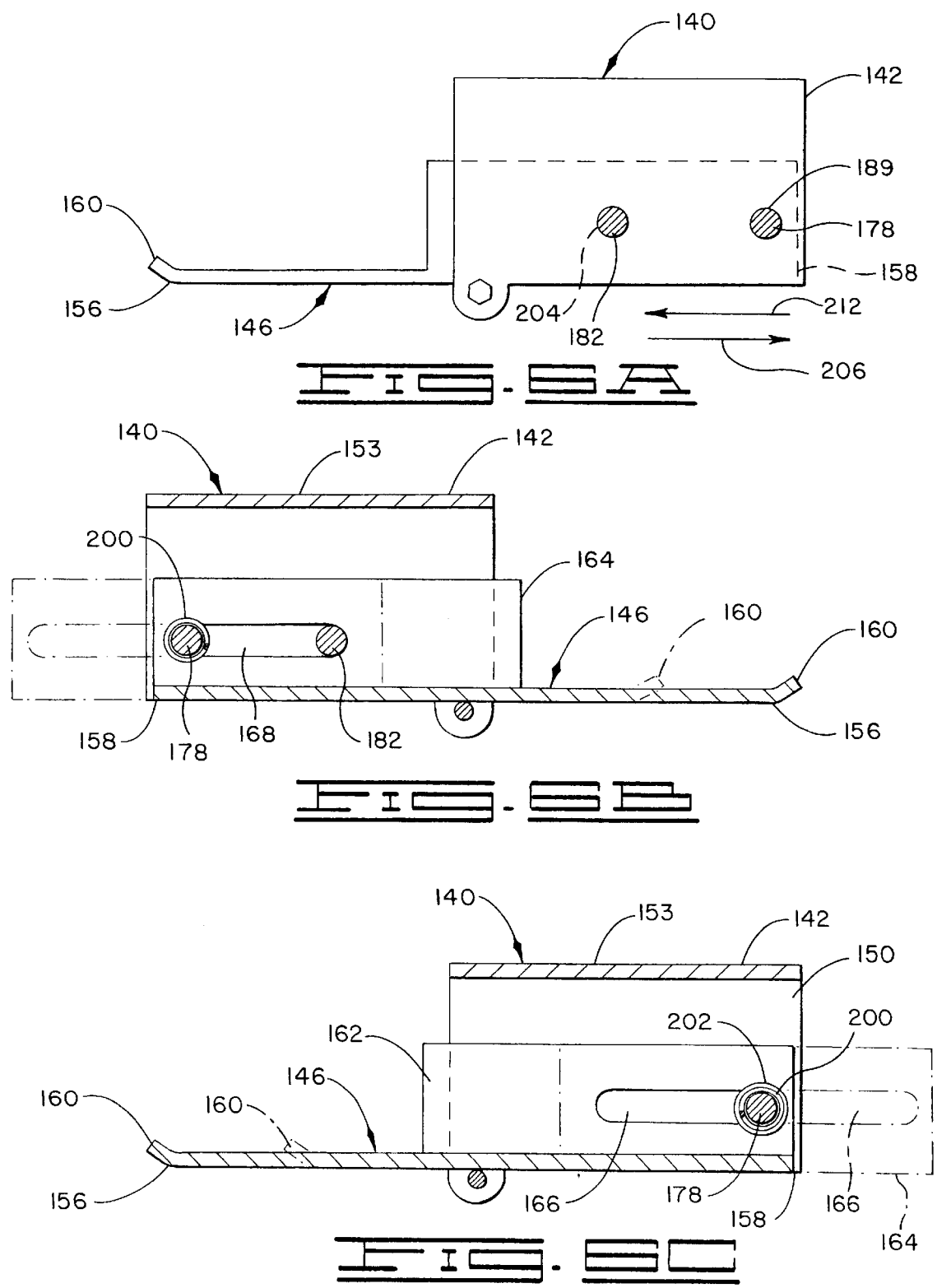

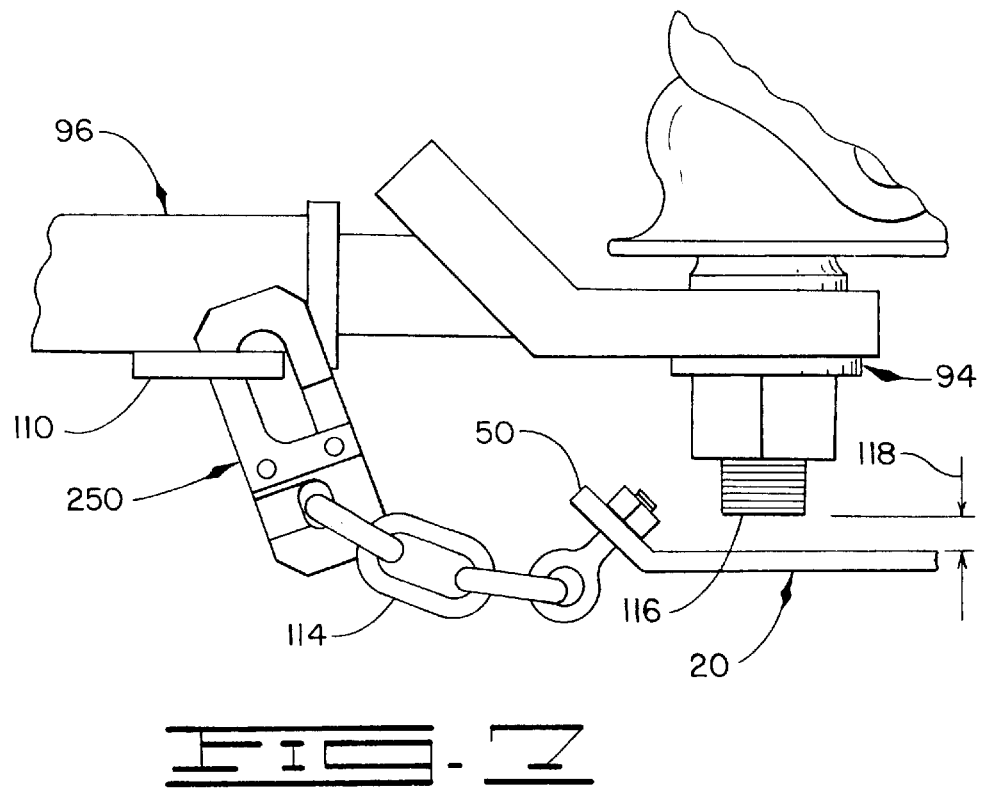
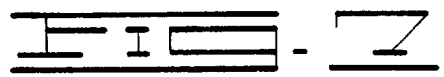
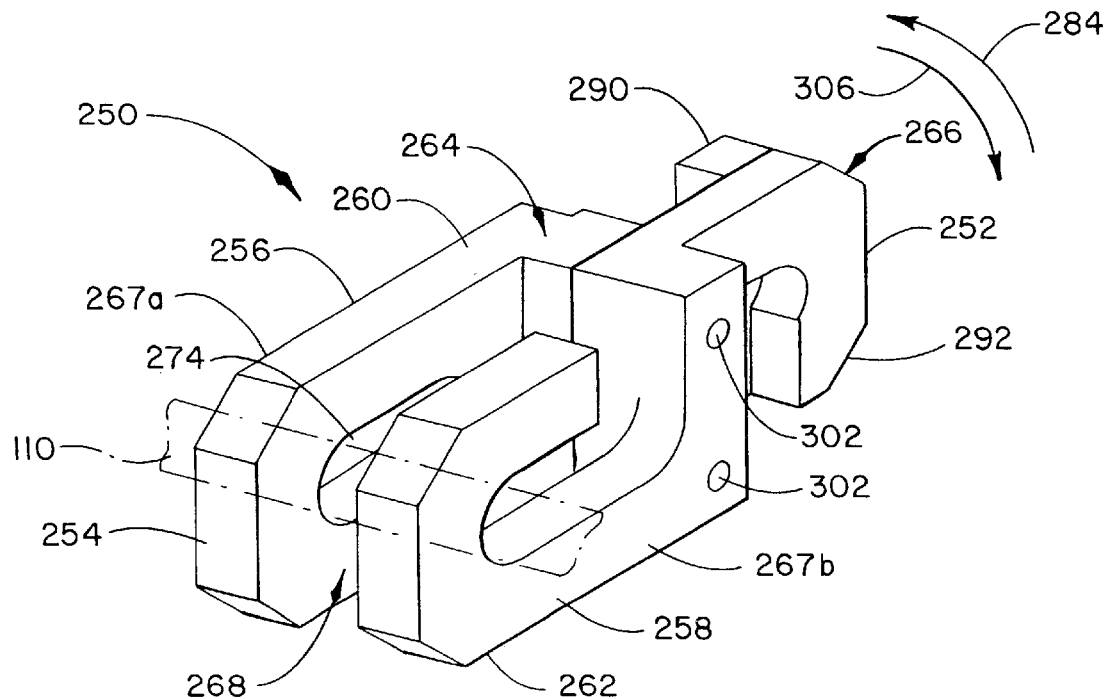
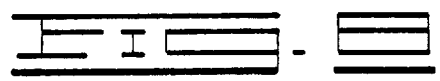

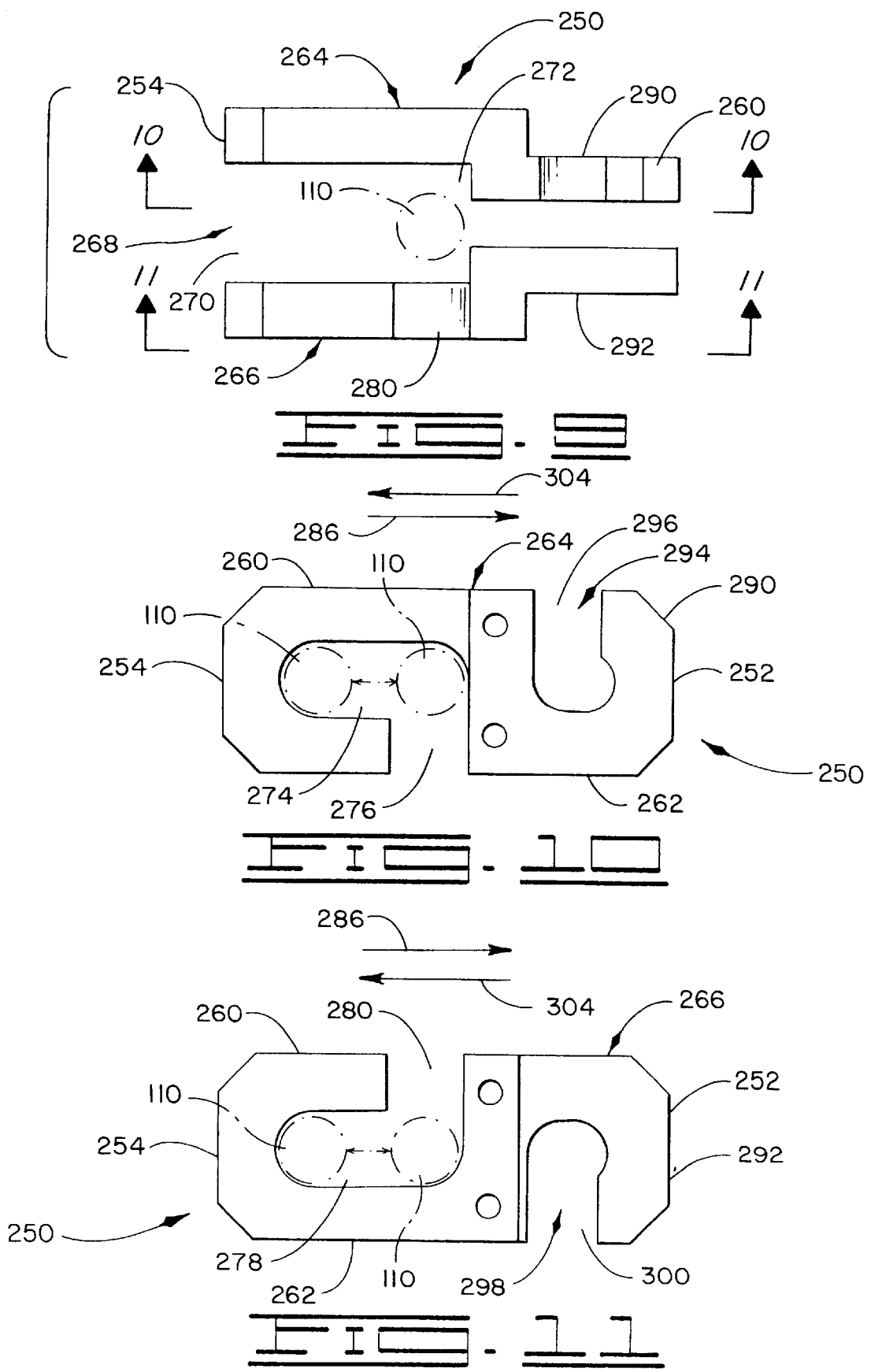

TRAILER DECOUPLING PREVENTION DEVICE

CROSS-REFERENCE TO RELATED APPLICATIONS

This application is a continuation of U.S. Ser. No. 09/186,299, filed Nov. 4, 1998, now abandoned.

STATEMENT REGARDING FEDERALLY SPONSORED RESEARCH OR DEVELOPMENT

Not applicable.

BACKGROUND OF THE INVENTION

The conventional type of trailer hitch that is in widespread use includes a trailer hitch which is mounted on a vehicle which is to tow a trailer. A socket formed in the tongue of the trailer receives a portion of the trailer hitch once the socket has been placed onto such trailer hitch. A locking mechanism is then provided on the trailer tongue to maintain the trailer hitch in the socket. While the ball and socket type trailer hitch systems are very convenient to a user, problems have arisen with the use of this type of system. A well known danger that exists with regard to these systems is that the locking mechanism and the trailer tongue can work loose while the trailer is being towed. If this occurs, the trailer can separate from the towing vehicle to become a danger to persons using the public thoroughfare along which the trailer and towing vehicle are moving.

Because of this danger, a number of states require that the ball and socket hitch be supplemented by chains that connect the trailer to the vehicle so that should the ball become dislodged from the socket, the trailer and the towing vehicle will remain connected. Thus, the driver of the towing vehicle will retain at least some control over the movement of the trailer, and it is hoped, will be able to bring the trailer and towing vehicle safely to a halt. Unfortunately, these hopes are often not realized and practiced. Because of the flexibility and the length of the chains, the driver's control over the movements of the towing vehicle and trailer may be very limited. For example, the chains may have been connected in such a way that the front end of the trailer can undergo rapid side-to-side movements that make it very difficult for the driver of the towing vehicle to maintain control of the trailer as the driver brings them to a halt. Thus, while the chains may prevent the trailer from breaking loose from the towing vehicle, it may do so at the expense of causing the combined vehicle and trailer system to become a danger which is equal to or greater than the danger that would be presented by a freely moving trailer.

Although attempts have been made to produce a trailer decoupling prevention device which alleviates the before-mentioned problems of the safety chains, such attempts have either required a specialized trailer hitch or are difficult and costly to use. Thus, a need exists for a trailer decoupling prevention device which substantially uses a commercially available trailer hitch and trailer to provide a less costly and more desirable trailer decoupling prevention device. It is to such an improved trailer decoupling prevention device which the present invention is directed.

BRIEF SUMMARY OF THE INVENTION

The present invention relates generally to a trailer decoupling prevention device for preventing a trailer from decoupling from a trailer hitch mounted on a towing vehicle. The trailer decoupling prevention device basically comprises a bracket, a connector assembly, a lower plate, and a lower plate stop assembly. The connector assembly is adapted to connect the bracket to the trailer. The lower plate is movably supported by the bracket. The lower plate stop assembly selectively permits movement of the lower plate between a coupled position and an uncoupled position. In the coupled position, at least a portion of the lower plate is positioned to prevent the trailer from being removed from the trailer hitch. In the uncoupled position, the lower plate is positioned to permit removal of the trailer from the trailer hitch.

Thus, it can be seen that the trailer decoupling prevention device of the present invention provides a reliable yet convenient device for preventing a trailer from decoupling from a trailer hitch and thereby becoming a lethal projectile as discussed previously.

BRIEF DESCRIPTION OF THE SEVERAL VIEWS OF THE DRAWING

FIG. 6A is a cross-sectional view of the second embodiment of the trailer decoupling prevention device, taken along the lines 6A—6A in FIG. 6.

FIG. 6B is a cross-sectional view of the second embodiment of the trailer decoupling prevention device, taken along the lines 6B—6B in FIG. 6.

FIG. 6C is a cross-sectional view of the second embodiment of the trailer decoupling prevention device, taken along the lines 6C—6C in FIG. 6.

FIG. 7 is a partial, side elevational view depicting a coupling member constructed in accordance with the present invention wherein the coupling member is installed on a corresponding attachment member, which is connected to the towing vehicle.

FIG. 8 is a perspective view of the coupling member depicted in FIG. 7.

FIG. 9 is a plan view of the coupling member depicted in FIGS. 7–8, wherein the coupling member is formed from two interconnected side members, which are shown in a separated condition for purposes of clarity.

FIG. 10 is a side elevational view of one of the side members of the coupling member, taken along the lines 10—10 in FIG. 9.

FIG. 11 is a side elevational view of the other one of the side members of the coupling member, taken along the lines 11—11 of FIG. 9.

DETAILED DESCRIPTION OF THE INVENTION

Figure 1:
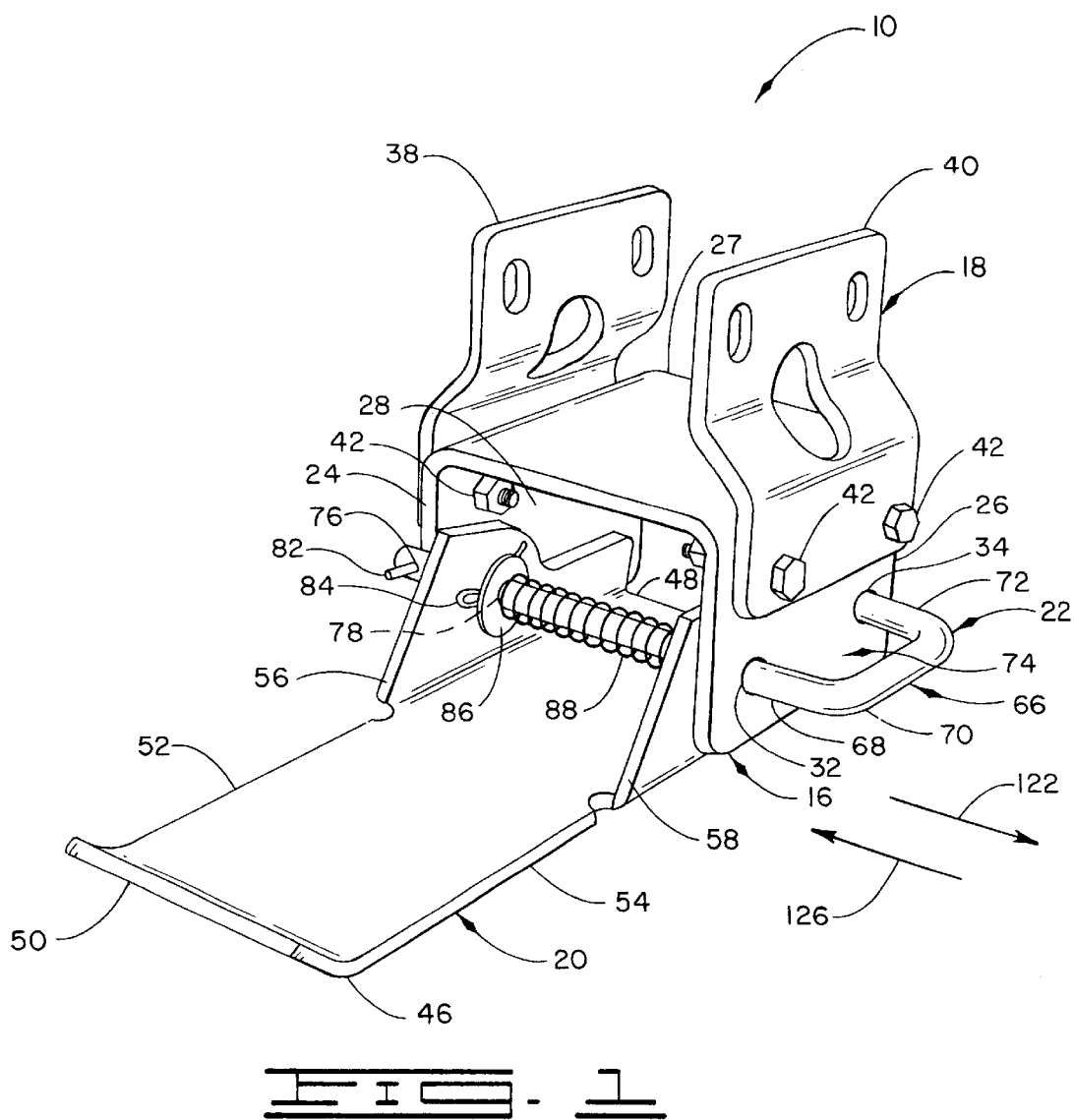
FIG. 1 is a perspective view of a trailer decoupling prevention device constructed in accordance with the present invention.
Figure 3:
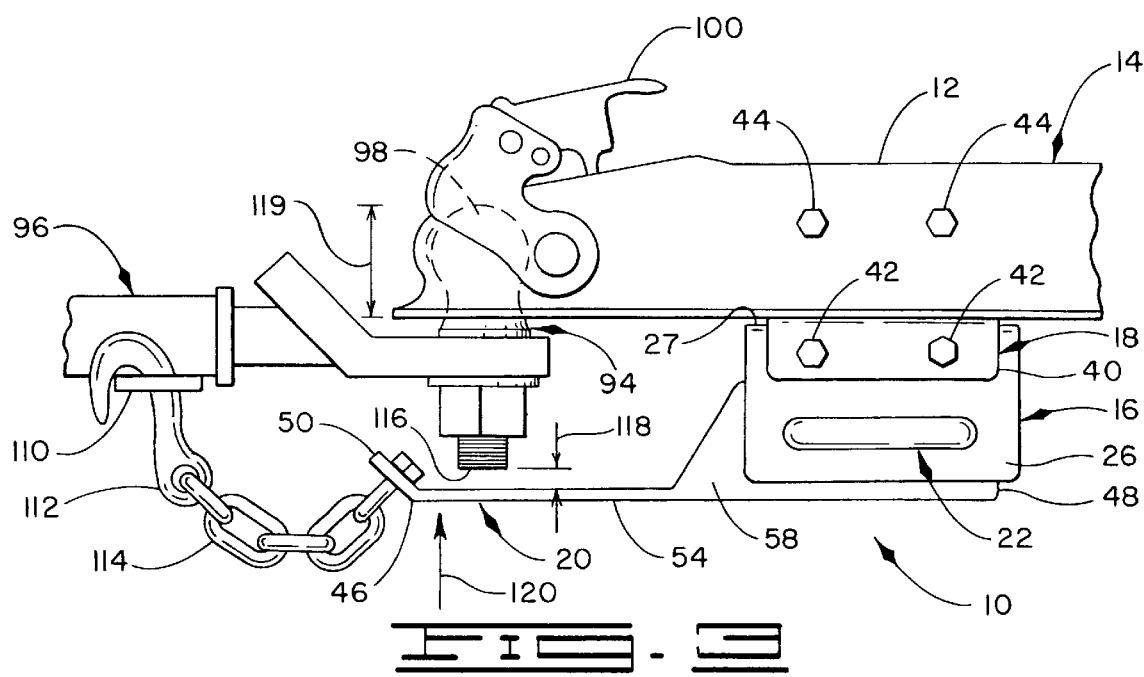
FIG. 3 is a side elevational view of the trailer decoupling prevention device of the present invention being mounted to the tongue of a trailer and having portions disposed generally below and spaced a distance from a trailer hitch mounted on a towing vehicle.

Referring now to the drawings, and more particularly to FIG. 1, shown therein is a trailer decoupling prevention device 10 constructed in accordance with the present invention. As shown in FIG. 3, the trailer decoupling prevention device 10 is adapted to be connected to and supported by a tongue 12 of a trailer 14. The trailer decoupling prevention device 10 is provided with a bracket 16, a connector assembly 18 adapted to connect the bracket 16 to the tongue 12 of the trailer 14, a lower plate 20, and a lower plate stop assembly 22.

The bracket 16 has a first side member 24, and a second side member 26. The first side member 24 is spaced a distance from the second side member 26 by a top member 27 so as to define a receiving space 28 therebetween. A pair of aligned apertures 30 (FIG. 2) and 32 (FIG. 1) are formed in the first side member 24 and the second side member 26, for a purpose to be described hereinafter. A second aperture 34 (FIG. 1) is also formed in the second side member 26 for a purpose to be described hereinafter.

The connector assembly 18 is adapted to secure the bracket 16 to the tongue 12. The connector assembly 18 is provided with a first joggle bracket 38, and a second joggle bracket 40. The first joggle bracket 38, and the second joggle bracket 40 are secured to the first side member 24, and the second side member 26, respectively, via any suitable connector means, such as bolts 42. The first joggle bracket 38 and the second joggle bracket 40 extend from the bracket 16 and are adapted to be secured to the tongue 12 of the trailer 14 via any suitable connector assembly 44 (FIG. 3), such as bolts for example.

The lower plate 20 has a first end 46 and a second end 48. An upturned lip 50 is formed on the first end 46 of the lower plate 20. The lower plate 20 is also provided with a first side 52, and a second side 54.

The lower plate 20 is also provided with a first lug 56 and a second lug 58, which are preferably unitarily connected to the lower plate 20 at the first and second sides 52 and 54 thereof. The first and second lugs 56 and 58 extend upwardly from the lower plate 20 in a substantially parallel, spaced apart relationship such that the first lug 56 is disposed near the first side member 24 of the bracket 16, and the second lug 58 is disposed near the second side member 26 of the bracket 16. A transverse hole 60 is formed through the lugs 56 and 58. The transverse hole 60 is aligned with the apertures 30 and 32 formed in the bracket 16. It should be noted that the first and second lugs 56 and 58 extend from the lower plate 20 near the second end 48 thereof.

Figure 2:
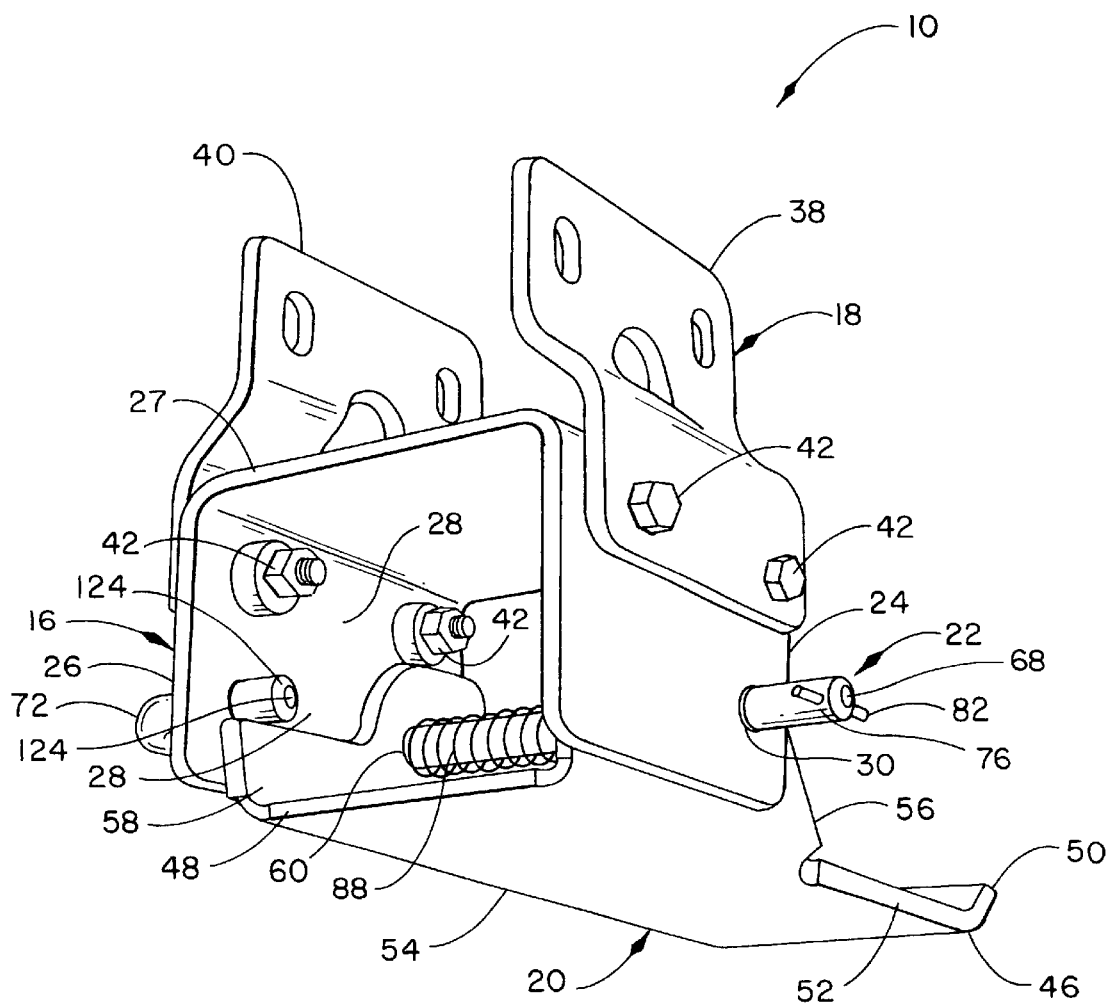
FIG. 2 is a perspective view of the trailer decoupling prevention device depicted in FIG. 1, wherein the trailer decoupling prevention device is depicted at an angle generally opposite that depicted in FIG. 1.

The lower plate stop assembly 22 includes a pin 66. The aligned apertures 30 and 32, the transverse hole 60, and the second aperture 34 are all adapted to receive predetermined portions of the pin 66. The pin 66 is provided with a first shaft member 68, a second shaft member 70 and a third shaft member 72, which can be unitarily constructed and connected in a J-shape substantially as shown in FIGS. 1 and 2. The first shaft member 68 is positioned through the aligned apertures 30 and 32, and the transverse hole 60, and the third shaft member 72 is positioned through the second aperture 34 formed in the second side member 26 so that the pin 66 can reciprocate freely therein. As best shown in FIG. 2, the third shaft member 72 has a length which is less than the length of the first shaft member 68.

The first shaft member 68 and the third shaft member 72 cooperate to selectively provide a rigid connection between the lower plate 20 and the bracket 16. The second shaft member 70 is disposed generally between the first shaft member 68 and the third shaft member 72 such that an opening 74 (FIG. 1) is defined between the second shaft member 70 and the second side member 26 to receive a portion of the hand of an individual to facilitate the gripping and subsequent reciprocating movement of the pin 66 in the aligned apertures 30 and 32, the transverse hole 60, and the second aperture 34.

Two openings 76 and 78 are formed through the first shaft member 68. As best shown in FIG. 2, the opening 76 is formed through a portion of the first shaft member 68 which extends generally past the first side member 24 of the bracket 16. The opening 76 is sized to securely receive a first pin 82. As best shown in FIG. 1, the opening 78 is formed through the first shaft member 68 generally in between the first and second lugs 56 and 58 of the lower plate 20. A second pin 84 is disposed through the opening 78 and maintained therein, such as by bending the second pin 84. A stop plate 86 is disposed between the second pin 84 and the second lug 58. A bias assembly 88, such as a spring, is disposed in between the stop plate 86 and the second lug 58 to bias the stop plate 86 away from the second lug 58.

The distance which the first pin 82 is maintained from the outer side of the first side member 24 is slightly greater than the distance which the third shaft member 72 extends past the second side member 26 of the bracket 16 so that upon movement of the second shaft member 70 away from the second side member 26, the end of the third shaft member 72 is retracted into the second side member 26 before the first pin 82 engages the first side member 24.

As best shown in FIG. 2, the lower plate 20 is pivotally attached to the bracket 16 via the first shaft member 68. However, the pivotation of the lower plate 20 in a direction away from the tongue 12 is restricted by the engagement of the second lug 58 and the third shaft member 72, when the third shaft member 72 is positioned past the second side member 26 of the bracket 16, for a purpose to be described hereinafter.

Referring now to FIG. 3, the trailer decoupling prevention device 10 is shown in an installed position on the tongue 12 of the trailer 14. That is, the first and second joggle brackets 38 and 40 are attached to the tongue 12 of the trailer 14 via the bolts 44. In the installed position, the lower plate 20 is disposed underneath the tongue 12, and in a substantially spaced apart, parallel relationship with the tongue 12.

Only a portion of the towing vehicle 96 is shown in FIG. 3 for purposes of clarity. The trailer hitch 94 can be any suitable trailer hitch, such as a commercially available ball type trailer hitch adapted to be disposed in a socket 98 (shown in dashed lines in FIG. 3) formed in an underside of the tongue 12. Once the trailer hitch 94 is disposed in the socket 98 of the tongue 12, the trailer hitch 94 can be secured therein via any suitable latching device 100.

A pair of attachment members 110 are provided on the towing vehicle 96 with one attachment member 110 being disposed on a respective side of the trailer hitch 94 and each attachment member 110 being connected to the towing vehicle 96. Only one attachment member 110 is shown in FIG. 3 for purposes of clarity. The attachment member 110 is sized and dimensioned to receive respective coupling members 112 therethrough. The coupling members 112 are attached to the upturned lip 50 via respective flexible linkages 114, such as a chain, strap or belt. Because the upturned lip 50 is positioned between the trailer hitch 94 and the attachment member 110, typically, only about two to eight inches of the flexible linkage 114 are necessary. The positioning of the attachment of the flexible linkage 114 near the pivot point of the trailer hitch 94 allows the tongue 12 to rotate relative to the towing vehicle 96 in a full turning radius while also permitting the length of the flexible linkage 114 to be reduced relative to prior art flexible linkages to prevent the lower plate 20 from (1) striking the ground, and/or the rear of the towing vehicle 96; or (2) swinging wildly from side-to-side, if the trailer hitch 94 breaks and the trailer 14 becomes decoupled from the trailer hitch 94.

Figure 4:
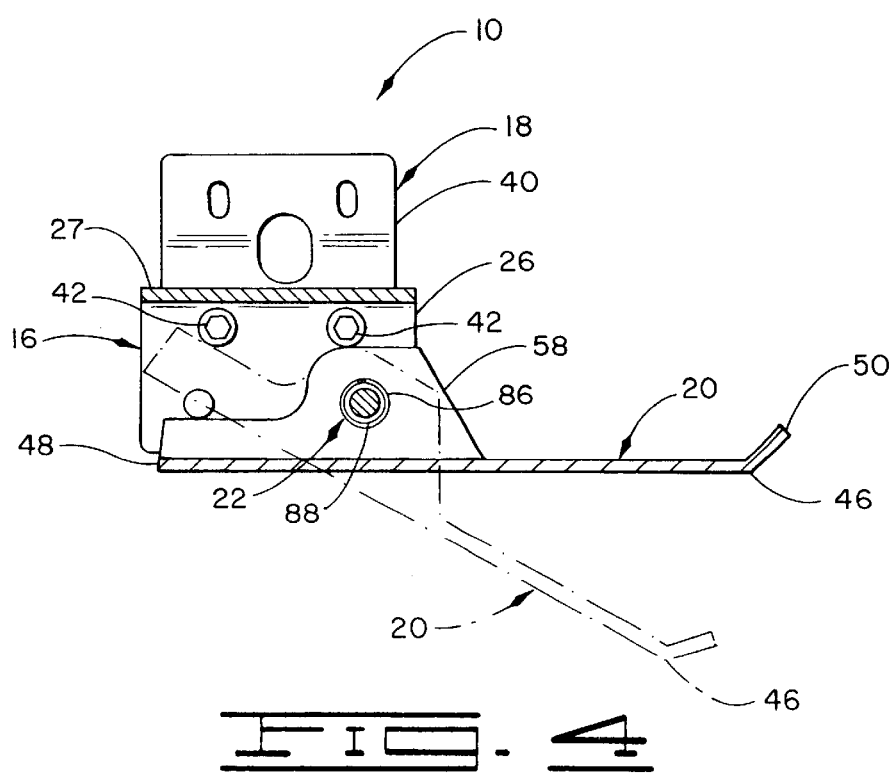
FIG. 4 is a side elevational, partial cross-sectional view of the trailer decoupling prevention device depicted in FIGS. 1–3.

As shown in FIG. 4, the lower plate 20 can be moved vertically from a coupled position to a decoupled position (as shown in dashed lines in FIG. 4) when the pin 66 is moved away from the second side member 26 of the bracket 16. The trailer decoupling prevention device 10 is shown in FIG. 3 in the coupled position. In the coupled position, the lower plate 20 extends a predetermined distance below a lower end 116 of the trailer hitch 94 to form a gap 118 therebetween. The gap 118 has a length, which is less than a height 119 of the trailer hitch 94 so that in the event that the tongue 12 of the trailer 14 is moved upwardly, the lower plate 20 will engage the lower end 116 of the trailer hitch 94 before the tongue 12 is lifted off of the trailer hitch 94. Generally, the gap 118 has a length of about one-half inch to about one inch although the length of the gap 118 may be increased depending upon the height 119 of the trailer hitch 94.

The gap 118 permits the lower plate 20 of the trailer decoupling prevention device 10 to move in a vertical direction (as indicated by an arrow 120 in FIG. 3) when the towing vehicle 96 and the trailer 14 are traveling over uneven terrain, such as steep grades, driveways or curves so that the trailer hitch 94 and the tongue 12 are not bound and fatigued during the towing of the trailer 14. Thus, when the lower plate 20 of the trailer decoupling prevention device 10 is disposed in the coupled position and the tongue 12 of the trailer 14 is disposed on the trailer hitch 94, the tongue 12 of the trailer 14 is securely and rigidly fastened to the trailer hitch 94 to prevent separation of the trailer 14 from the towing vehicle 96. As discussed before, in the event that the trailer hitch 94 breaks and the tongue 12 thereby become separated from the trailer hitch 94, the unique attachment location of the flexible linkage 114 to the upturned lip 50 of the lower plate 20 prevents the tongue 12 of the trailer 14 from (1) swinging wildly, and (2) striking the rear of the towing vehicle 96, or striking ground thereby preventing separation of the trailer 14 from the towing vehicle 96 or a loss of control of the towing vehicle 96.

To unhitch the trailer 14 from the towing vehicle 96, an individual grips the second shaft member 70 of the pin 66 and pulls the pin 66 in a direction 122 (as shown in FIG. 1) against the force of the bias assembly 88 (as shown in FIG. 2) until an end 124 of the third shaft member 72 is recessed within the second side member 26 of the bracket 16. In this position, gravity causes the lower plate 20 to pivot about the first shaft member 68 to move the lower plate 20 from the coupled position to the decoupled position, as shown in FIG. 4. Once the lower plate 20 is in the decoupled position, sufficient clearance is provided between the lower plate 20 and the lower end 116 of the trailer hitch 94 to permit the tongue 12 of the trailer 14 to be lifted off of the trailer hitch 94.

Once the tongue 12 of the trailer 14 has been removed from the trailer hitch 94, the lower plate 20 can be moved upwardly from the decoupled position to the coupled position so that the lower plate 20 extends generally underneath the socket 98 formed in the tongue 12 of the trailer 14. In this position, the trailer hitch 94 cannot be disposed in the socket 98 until the lower plate 20 is moved back to the decoupled position. A lock (not shown) can be disposed on the portion of the first shaft member 68 extending past the first side member 24 to prevent the lower plate 20 from being moved from the coupled position to the decoupled position to serve as a theft deterrent.

It should be noted that when the lower plate 20 is moved from the decoupled position to the coupled position, the bias assembly 88 causes the pin 66 to move in a direction 126 (as shown in FIG. 1) to cause the end 124 of the third shaft member 72 to extend past the second side member 26 and to thereby engage the second lug 58 to thereby maintain the lower plate 20 in the coupled position.

To dispose the trailer hitch 94 in the socket 98 formed in the tongue 12, one first moves the pin 66 in the direction 122 so that gravity will cause the lower plate 20 to move from the coupled position to the decoupled position. Once the lower plate 20 is in the decoupled position, sufficient clearance is provided so that the trailer hitch 94 can be disposed in the socket 98. Once the trailer hitch 94 is disposed in the socket 98, the lower plate 20 is raised from the decoupled position to the coupled position where the pin 66 is automatically moved in the direction 126 by the bias assembly 88 to maintain the lower plate 20 in the coupled position.

THE EMBODIMENT OF FIGS. 5, 6, and 6A–6C

Figure 5:
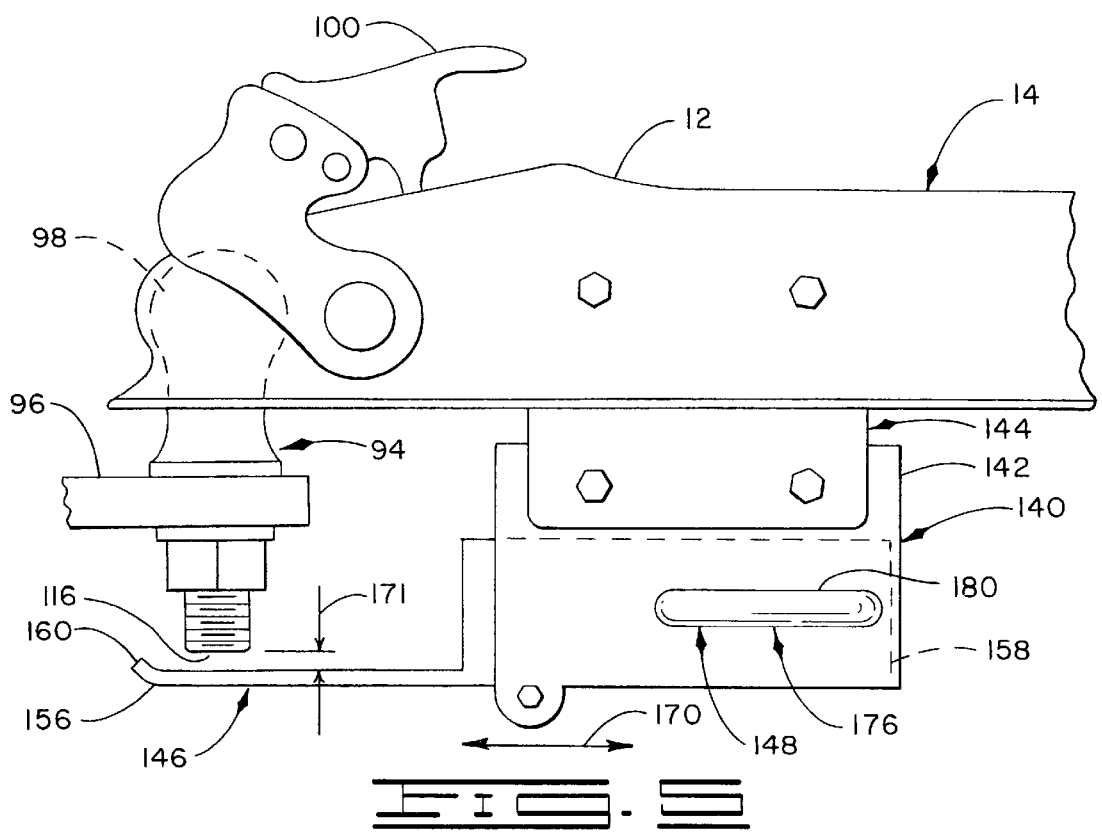
FIG. 5 is a side elevational view of a second embodiment of a trailer decoupling prevention device constructed in accordance with the present invention, wherein the trailer decoupling prevention device is supported by a tongue of a trailer.
Figure 6:
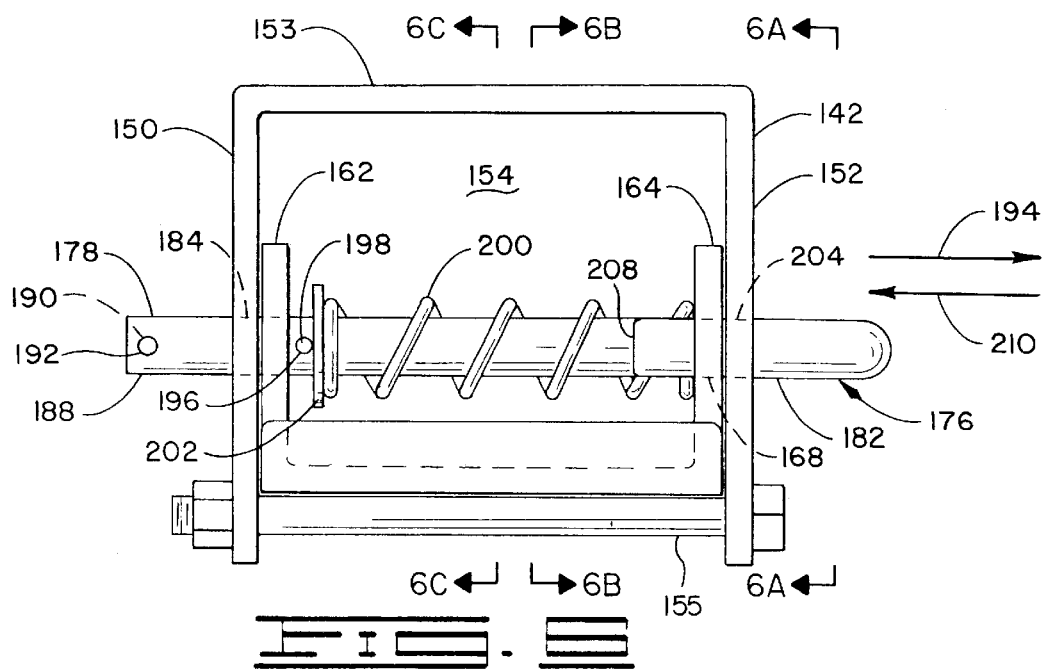
FIG. 6 is a frontal view of the second embodiment of the trailer decoupling prevention device depicted in FIG. 5, wherein the trailer decoupling prevention device is shown as being removed from the trailer tongue for purposes of clarity.

Shown in FIGS. 5 and 6 is a second embodiment of a trailer decoupling prevention device 140 constructed in accordance with the present invention. The trailer decoupling prevention device 140 is provided with a bracket 142, a connector assembly 144, a lower plate 146, and a lower plate stop assembly 148.

The bracket 142 is provided with a first side member 150 and a second side member 152. The first side member 150 and the second side member 152 are maintained in a substantially parallel, spaced apart relationship via a top member 153 to define a receiving space 154 therebetween. The receiving space 154 is sized to receive the lower plate 146 therein. The lower plate 146 is supported in the receiving space 154 by a support member 155. The support member 155 extends between and is connected to the first side member 150 and the second side member 152.

The connector assembly 144 can be constructed in an identical manner as the bracket 16 hereinbefore described with reference to FIGS. 1–3. Thus, no more comments are deemed necessary to teach one skilled in the art to make or use the connector assembly 144.

The lower plate 146 is provided with a first end 156, and a second end 158 (FIG. 6). An upturned lip 160 is formed on the first end 156 of the lower plate 146. A pair of lugs 162 and 164 extend upwardly from opposite sides of the lower plate 146, generally near the second end 158 thereof. Preferably, the lower plate 146 and the lugs 162 and 164 are integrally formed to provide a unitary structure.

A pair of elongated slots 166 (FIG. 6C) and 168 (FIG. 6B) are formed in the lugs 162 and 164 to permit the lower plate 146 to be selectively moved in a horizontal direction 170 generally towards and away from the trailer hitch 94 so that the lower plate 146 can be selectively disposed between a coupled position and uncoupled position (the uncoupled position is shown in FIGS. 6B and 6C via the dashed lines).

In the coupled position, a portion of the lower plate 146, desirably near the first end 156 thereof, is disposed underneath yet spaced a distance from the trailer hitch 94 to form a gap 171 between the lower plate 146 and the lower end 116 of the trailer hitch 94. The gap 171 is identical to the gap 118, hereinbefore described with reference to FIG. 3.

In the uncoupled position, the lower plate 146 is moved towards the bracket 142 so that the first end 156 of the lower plate 146 is no longer disposed generally underneath the trailer hitch 94, or the towing vehicle 96 so as to permit the tongue 12 of the trailer 14 to be lifted off of the trailer hitch 94, or disposed on the trailer hitch 94.

The lower plate stop assembly 148 is adapted and constructed to permit the selective movement of the lower plate 146 between the coupled position and the decoupled position. As best shown in FIG. 6, the lower plate stop assembly 148 includes a pin 176, which can have a substantially J-shape. The pin 176 is substantially identical in construction and function as the pin 66, hereinbefore described with reference to FIGS. 1–3. The pin 176 includes a first shaft member 178, a second shaft member 180, and a third shaft member 182. The first shaft member 178, the second shaft member 180 and the third shaft member 182 are preferably integrally constructed to form a unitary structure.

A transverse hole 184 is formed through the first side member 150, and the second side member 152 of the bracket 142. The transverse hole 184 is aligned with the slots 166 and 168 formed in the lugs 162 and 164.

The first shaft member 178 is disposed through the transverse hole 184, and the slots 166 and 168 such that a first portion 188 extends outwardly past the first side member 150, and a second portion 189 (FIG. 6A) extends outwardly past the second side member 152. An opening 190 is formed through the first portion 188 of the first shaft member 178. The opening 190 receives a first pin 192 therethrough. The first pin 192 serves to stop the movement of the pin 176 as the pin 176 is moved in a direction 194, generally away from the second side member 152 of the bracket 142. An opening 196 is formed through the first shaft member 178, generally in between the lugs 162 and 164 of the lower plate 146. The opening 196 receives a second pin 198.

The lower plate stop assembly 148 is also provided with a bias assembly 200, and a stop plate 202. The bias assembly 200, and the stop plate 202 are both disposed on the first shaft member 178, generally in between the second pin 198 and the lug 164 so that the bias assembly 200 biases the stop plate 202, and thus the pin 176 away from the lug 164.

A second aperture 204 (FIG. 6) is disposed through the second side member 152, and is aligned with the elongated slots 166 and 168. The third shaft member 182 is disposed through the second aperture 204, and through the elongated slot 168, substantially as shown in FIG. 6 when the lower plate 146 is disposed in the coupled position. When the third shaft member 182 is disposed through the elongated slot 168, the third shaft member 182 engages the lug 164, generally near a forward end of the elongated slot 168 so as to prevent the lower plate 146 from moving in a rearward direction 206 (FIG. 6A).

To move the lower plate 146 from the coupled position to the decoupled position, an individual grips the second shaft member 180, and applies force thereto to move the second shaft member 180 in the direction 194. The second shaft member 180, and thus the remainder of the pin 176 is moved in the direction 194 until the first pin 192 engages the first side member 150 of the bracket 142, and an end 208 of the third shaft member 182 is recessed in the second side member 152 of the bracket 142. In this position, the lower plate 146 is moved in the rearward direction 206 until the lower plate 146 is disposed in the decoupled position (as shown by the phantom lines in FIGS. 6B and 6C).

As the lower plate 146 is moved from the coupled position to the decoupled position, the individual can release the second shaft member 180 of the pin 176, and the movement of the pin 176 will be prevented by the lug 164 engaging the end 208 of the third shaft member 182. In other words, once the third shaft member 182 is removed from the slot 168, and the lower plate 146 is moved in the rearward direction 206, the end 208 of the third shaft member 182 engages the lug 164 to prevent movement of the pin 176 in a direction 210 (FIG. 6).

When it is desired to move the lower plate 146 from the decoupled position to the coupled position, force is applied to the lower plate 146 to move the lower plate 146 in a forward direction 212 (FIG. 6A) generally towards the socket 98 formed in the tongue 12 of the trailer 14. The lower plate 146 is moved until the slot 168 becomes aligned again with the second aperture 204. In this position, the bias assembly 200 automatically causes the pin 176 to move in the direction 210 such that the third shaft member 182 is disposed through the slot 168 to prevent movement of the lower plate 146 in the rearward direction 206, as previously discussed.

Thus, it can be seen that the trailer decoupling prevention device 140 serves to prevent the tongue 12 of the trailer 14 from separating from the trailer hitch 94, even if the latching device 100 fails, or the individual fails to latch the latching device 100. The gap 171 in between the lower plate 146 and the lower end 116 of the trailer hitch 94 allows the trailer 14 to move freely and also provides adequate clearance for turning and pulling the trailer 14 over uneven terrain, such as steep grades, driveways or curbs. An opening (not shown) can also be provided on the pin 176 to receive a removable retainer, such as a lock to prevent the pin 176 from being moved, and to thereby also prevent the lower plate 146 from being moved from the coupled position to the decoupled position. When the lower plate 146 is in the coupled position, the trailer decoupling prevention device 140 also serves as a theft deterrent as the trailer hitch 94 cannot be disposed, or removed from the socket 98 when the lower plate 146 is in the coupled position.

EMBODIMENT OF FIGS. 7–11

Shown in FIGS. 7–11 is a unique coupling member 250, which is constructed in accordance with the present invention. The coupling member 250 is configured to provide a reliable attachment device between the flexible linkage 114, and the attachment member 110. Once the coupling member 250 is disposed on the attachment member 110, the coupling member 250 is configured such that the attachment member 110 is trapped within the coupling member 250 to prevent the inadvertent removal of the coupling member 250 from the attachment member 110. One important advantage of the coupling member 250 is that it prevents inadvertent removal from the attachment member 110, without utilizing any springs or moving assemblies.

One embodiment of the coupling member 250 is shown in FIGS. 8–11. The coupling member 250 has a first end 252, a second end 254, a first side 256, a second side 258, a top side 260, and a bottom side 262. The coupling member 250 is also provided with a pair of interconnected, side members 264 and 266.

The side members 264 and 266 extend in between the first and second ends 252 and 254, and in between the top side 260 and the bottom side 262. The side members 264 and 266 have portions 267a and 267b which are spaced a distance apart to define an attachment member receiving passageway 268 therebetween. The attachment member receiving passageway 268 has a first end 270, and a second end 272. The first end 270 of the attachment member receiving passageway 268 communicates with the second end 254 of the coupling member 250. The attachment member receiving passageway 268 is sized and dimensioned to receive at least a portion of the attachment member 110 through the first end 270 thereof such that the portion of the attachment member 110 can be moved from the first end 270, to the second end 272 of the attachment member receiving passageway 268 (as best shown in FIG. 9 via dashed lines).

The side member 264 defines an attachment loop slot 274 (FIGS. 8 and 10) adapted to receive at least a portion of the attachment member 110 therein through an entranceway 276 (FIG. 10). As best shown in FIG. 10 in combination with FIG. 8, the entranceway 276 communicates with the first side 256 and also communicates with the bottom side 262 of the coupling member 250.

The side member 266 defines an attachment loop slot 278 therein, which is sized and dimensioned to receive at least a portion of the attachment member 110 therein through an entranceway 280. As best shown in FIGS. 8 and 11, the entranceway 280 communicates with the second side 258 and the top side 260 of the coupling member 250. It should be noted that the entranceway 276, and the entranceway 280 are formed on generally opposite sides of the coupling member 250 and are aligned, for a purpose to be described hereinafter. The entranceway 276, and the entranceway 280 are disposed generally adjacent the second end 272 (FIG. 9) of the attachment member receiving passageway 268. To connect the coupling member 250 to the attachment member 110, the attachment member 110 is disposed through the attachment member receiving passageway 268, from the first end 270 thereof to the second end 272 thereof (as best shown in FIG. 9). Once the attachment member 110 is disposed adjacent the second end 272 of the attachment member receiving passageway 268, the coupling member 250 is rotated in a counterclockwise direction 284 (as shown in FIG. 8) until the attachment member 110 is disposed through the entranceways 276 and 280, and into the attachment loop slots 274 and 278 (as shown in dashed lines in FIGS. 10 and 11). In this position, the coupling member 250 is moved in a direction 286 (FIGS. 10 and 11), generally away from the attachment member 110 until the attachment member 110 engages the side members 264 and 266, as shown in FIG. 8.

The side members 264 and 266 are provided with portions 290 and 292 disposed adjacent the first end 252 thereof. The portions 290 and 292 of the side members 264 and 266 are adapted to securely fasten the coupling member 250 to the flexible linkage 114. That is, the portion 290 is provided with a locking slot 294 adapted to receive at least a portion of the flexible linkage 114 therein through a receiving slot 296 formed through the top side 260 of the coupling member 250. The portion 292 is also provided with a locking slot 298 adapted to receive portions of the flexible linkage 114 therein through a receiving slot 300 formed in the bottom side 262 of the coupling member 250. When the side member 264 and the side member 266 are connected (as shown in FIG. 8), the locking slot 294 and the locking slot 298 are generally aligned.

To connect the flexible linkage 114 to the coupling member 250, the side member 264 and the side member 266 are provided as separate pieces. A portion of the flexible linkage 114 is then inserted through the receiving slot 296 and into the locking slot 294 of the side member 264. The same portion of the flexible linkage 114 is then inserted through the receiving slot 300 and into the locking slot 298 of the side member 266. In this position, the side members 264 and 266 are connected via any suitable connector assembly 302, such as rivets, for example, so as to trap the portion of the flexible linkage 114 in the aligned locking slots 294 and 298 thereby connecting the coupling member 250 to the flexible linkage 114.

Once the flexible linkage 114 has been connected to the coupling member 250, the coupling member 250 can be attached to the attachment member 110 by disposing a portion of the attachment member 110 through the attachment member receiving passageway 268, and rotating the coupling member 250 in the counterclockwise direction 284, as previously discussed. To remove the coupling member 250 from the attachment member 110, this process is reversed. That is, the coupling member is moved in a direction 304 (FIGS. 10 and 11) generally towards the attachment member 110, until the attachment member 110 is disposed adjacent the entranceways 276 and 280. In this position, the coupling member 250 is rotated in a clockwise direction 306 (FIG. 8) until the attachment member 110 is disposed in the attachment member receiving passageway 268. The coupling member 250 is then moved in the direction 286 (FIGS. 10 and 11) to remove the coupling member 250 from the attachment member 110.

The side members 264 and 266 of the coupling member 250 can be constructed of a rigid material, such as steel.

EMBODIMENT OF FIGS. 12–14

Figure 12:
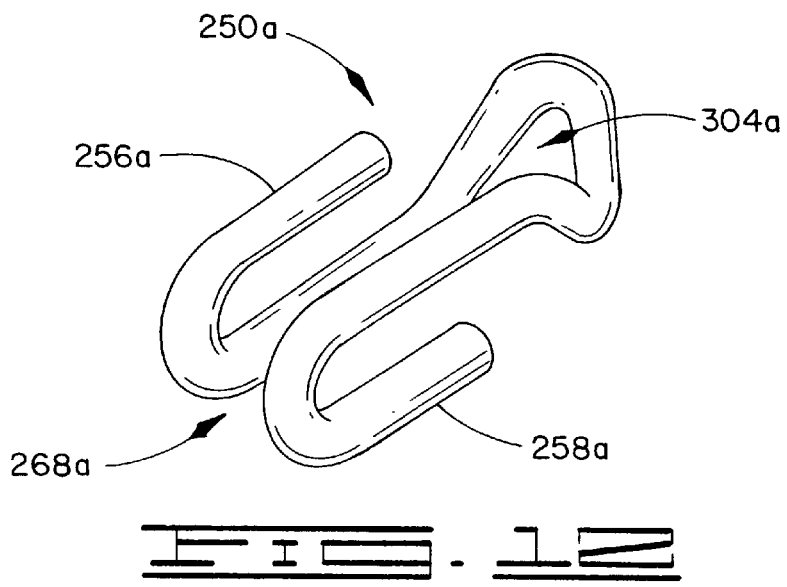
FIG. 12 is a perspective view of a second embodiment of a coupling member constructed in accordance with the present invention.
Figure 13:
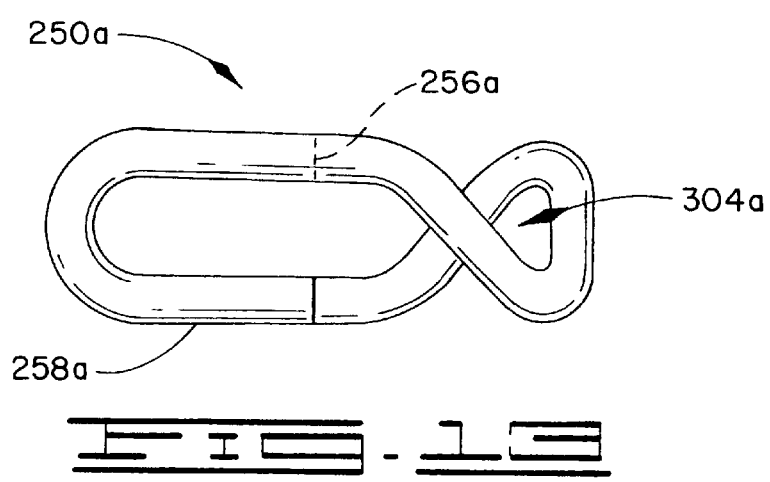
FIG. 13 is a side elevational view of the coupling member depicted in FIG. 12.
Figure 14:
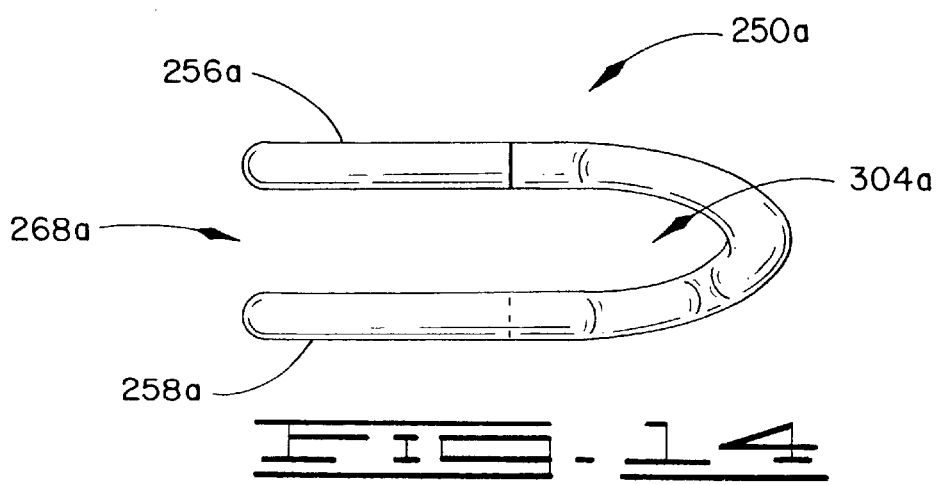
FIG. 14 is a plan view of the coupling member depicted in FIGS. 12 and 13.

Shown in FIGS. 12–14 and designated by the general reference numeral 250a is a second embodiment of a unique coupling member, which is constructed in accordance with the present invention. The coupling member 250a is configured to provide a reliable attachment device between the flexible linkage 114, and the attachment member 110 in a similar manner as the coupling member 250, discussed above with reference to FIGS. 7–11. The coupling member 250a is substantially identical in construction and function as the coupling member 250, except that the coupling member 250a is integrally formed from a single piece of a rigid material, such as steel, and the coupling member 250a is provided with a locking slot 304a which communicates with an attachment member receiving passageway 268a such that the flexible linkage 114 can be attached to the coupling member 250a by threading a portion of the flexible linkage 114 onto the coupling member 250a until the flexible linkage 114 is disposed in the locking slot 304a. The coupling member 250a can be formed from a single piece of rigid material, which has been bent into the configuration shown in FIGS. 12–14. When the coupling member 250a is utilized to secure connect the trailer 14 to the towing vehicle 96, the coupling member 250a can be formed from ⅜ inch diameter steel having a substantially circular cross-section.

EMBODIMENT OF FIGS. 15–19

Figure 15:
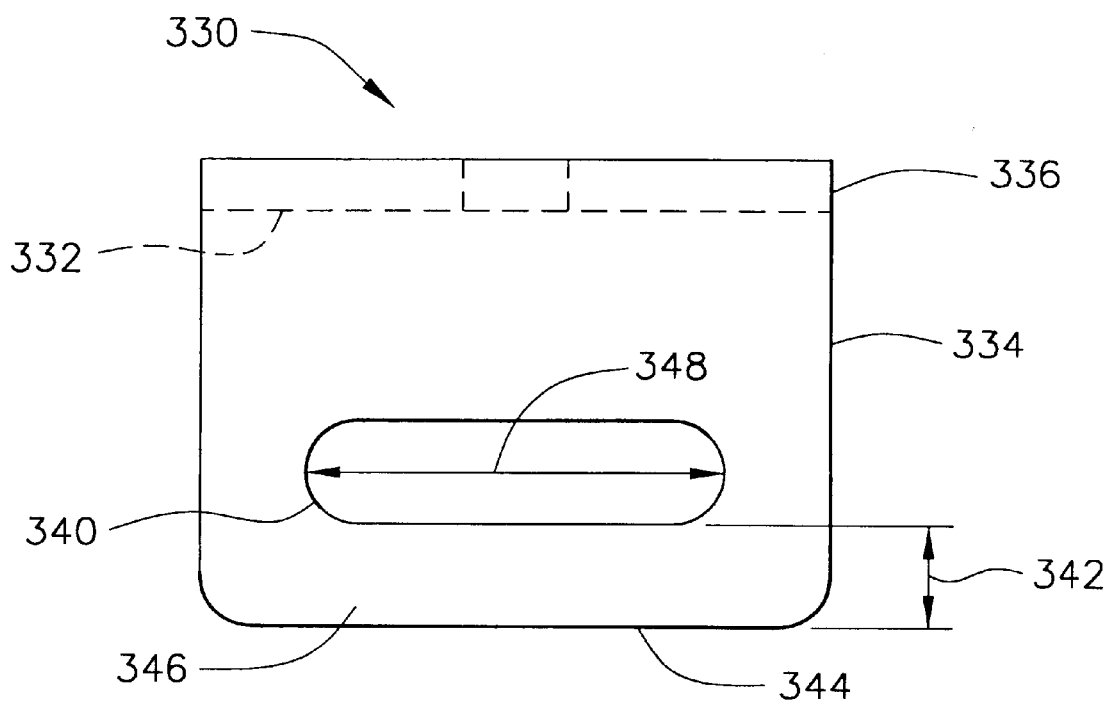
FIG. 15 is a front elevational view of a unique attachment plate, constructed in accordance with the present invention.
Figure 16:
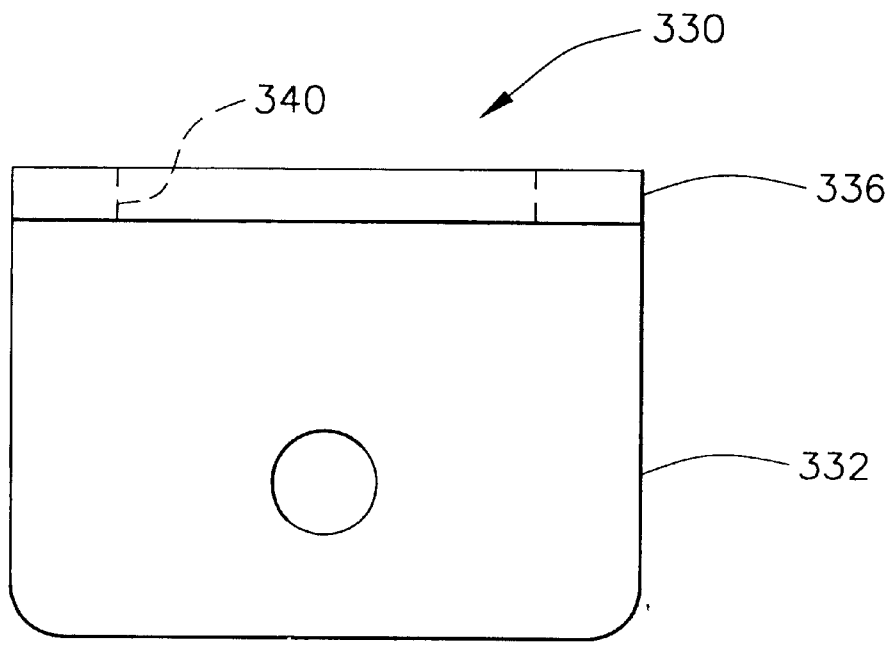
FIG. 16 is a top plan view of the attachment plate depicted in FIG. 15.
Figure 17:
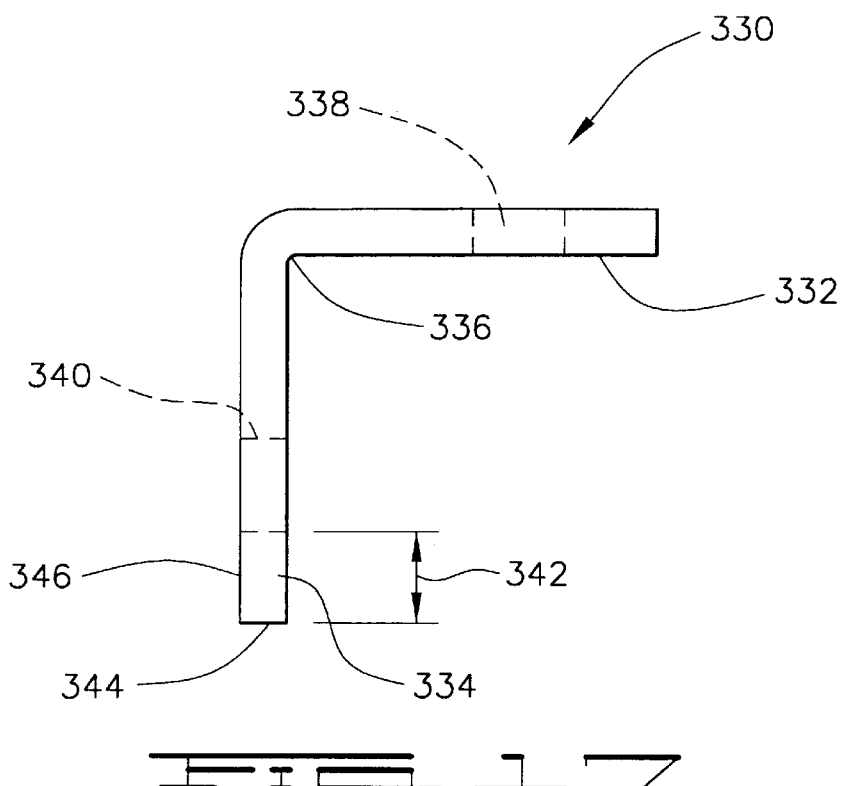
FIG. 17 is a side elevational view of the attachment plate depicted in FIGS. 15 and 16.

Referring now to FIGS. 15–17, shown therein and designated by the general reference numeral 330 is a unique attachment plate constructed in accordance with the present invention for connecting either the coupling member 250 or the coupling member 250a to the towing vehicle 96. The attachment plate 330 basically comprises a first leg 332 and a second leg 334. The first leg 332 is connected to an upper end 336 of the second leg 334. In one embodiment, the first leg 332 and the second leg 334 can be integrally formed from a single piece of rigid material, such as steel, so as to form a unitary structure.

The first leg 332 is shaped so as to matingly engage a portion of the towing vehicle 96, such as the underside of the bumper (not shown) of the towing vehicle 96. An opening 338 is formed in the first leg 332 so as to permit a bolt to be disposed therethrough for connecting the first leg 332 to the towing vehicle 96.

The second leg 334 extends from the first leg 332 in a substantially vertical orientation when the first leg 332 is connected to the towing vehicle 96, as previously discussed. An elongate slot 340 is formed through the second leg 334 of the attachment plate 330. The elongate slot 340 is spaced a distance 342 from a lower end 344 of the second leg 334. An attachment loop portion 346 of the second leg 334 is defined in between the elongate slot 340 and the lower end 344 thereof.

The elongate slot 340 is provided with a length 348 and a height 350. As will be explained below, the magnitudes of the distance 342, the length 348, and height 350 are critical to insure proper operation of the coupling members 250 and 250a with the attachment plate 330.

Figure 18:
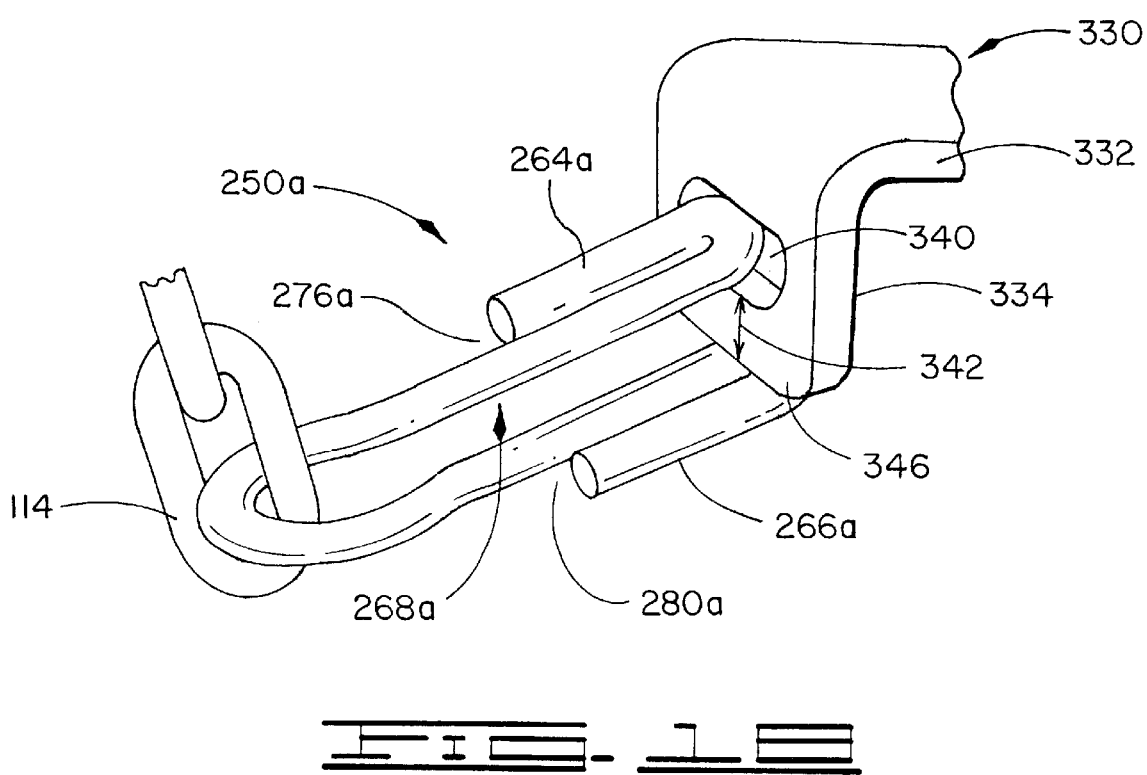
FIG. 18 is a perspective view illustrating the coupling member depicted in FIGS. 12–14 being disposed on the attachment plate depicted in FIGS. 15–17.

Referring now to FIG. 18, the relative dimensions of the elongate slot 340 and of the attachment loop portion 346 of the second leg 334, as related to the coupling member 250a, by way of example, is shown. The distance 342 is sized such that the attachment loop portion 346 can be disposed in the attachment loop receiving passageway 268a, as shown in FIG. 18. The length 348 (see FIG. 15) is sized so as to be slightly wider than one of the side member 264a and 266a of the coupling member 250a. By way of example, a portion of the side member 264a is shown as being disposed in the elongate slot 340. Thus, it can also be seen that the height 350 of the elongate slot 340 is slightly greater than the thickness of the side portion 264a, for example, so that the attachment loop portion 346 of the attachment plate 330 can be positioned in the attachment loop receiving passageway 268a until the attachment loop portion 346 of the attachment plate 330 is aligned with entranceways 276a and 280a of the coupling member 250a so that the coupling member 250a can be rotated in the counterclockwise direction 284, as previously discussed with reference to FIGS. 8–11. Once the coupling member 250a has been rotated in the counterclockwise direction 284, the coupling member 250a is moved in the direction 286 (as shown in FIG. 11) to complete the installation of the coupling member 250a on the attachment plate 330. The coupling member 250a can be removed from the attachment plate 330 by reversing the steps of the previously described method.

Figure 19:
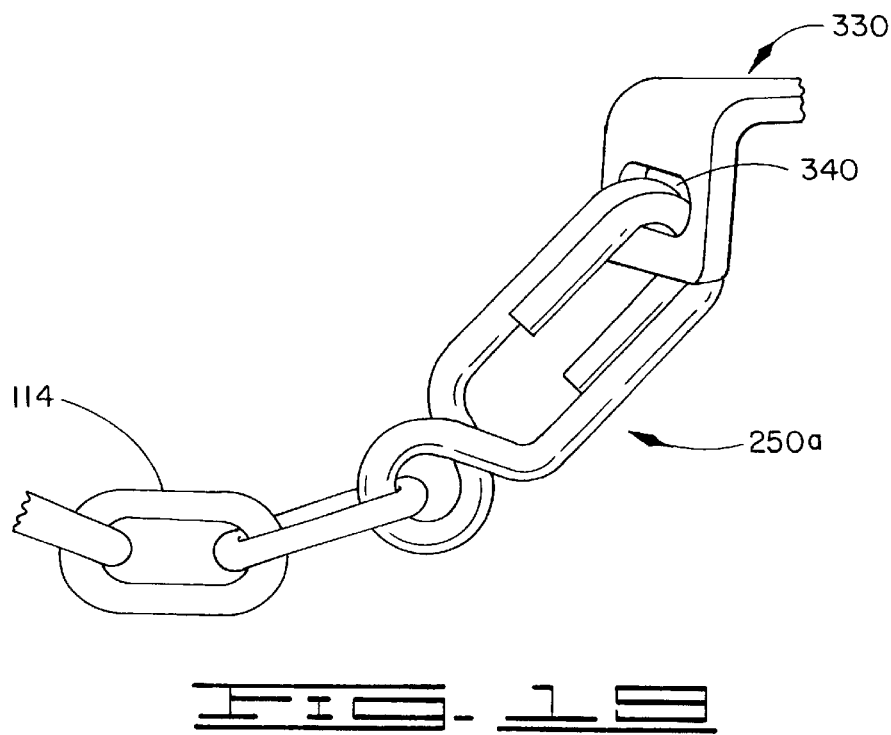
FIG. 19 is a perspective view illustrating the coupling member depicted in FIG. 18 being disposed on the attachment plate.

Shown in FIG. 19 is a perspective view of the coupling member 250a disposed on the attachment plate 330 in an installed position. It should be noted that the length 348, height 350, and the shape of the elongate slot 340 may substantially correspond to the size and the shape of the side member 264a or 266a, so as to prevent undesirable play of the coupling member 250a with the attachment plate 330, and thereby prevent inadvertent removal of the coupling member 250a from the attachment plate 330.

As a practical matter, when the distance 342 is sized to closely correspond with the distance in between the side members 264a and 266a, and the elongate slot 340 is sized and dimensioned to closely correspond to the shape of at least one of the side members 264a and 266a, the inadvertent removal of the coupling member 250a from the attachment plate 330 is nearly impossible.

EMBODIMENT OF FIG. 20

Figure 20:
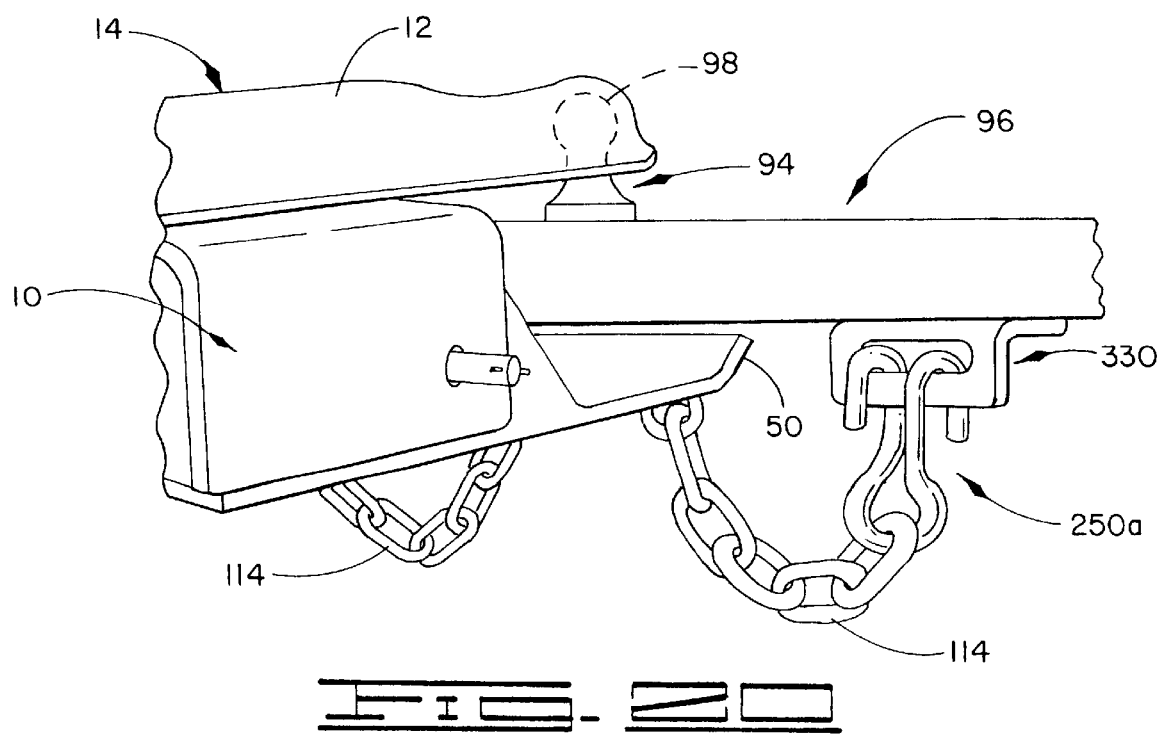
FIG. 20 is a perspective view illustrating a combination of the elements and assemblies hereinbefore described with reference to FIGS. 1–19 so as to provide a secure attachment between a trailer and a towing vehicle.

It should be noted that the various components disclosed herein can be used in combination to further reduce the possibility that the trailer 14 will decouple from the trailer hitch 94, which is mounted on the towing vehicle 96. For example, as shown in FIG. 20, the decoupling prevention device 10 is mounted on the tongue 12 of the trailer 14, as hereinbefore described with reference to FIG. 3. The trailer hitch 94 is mounted on the towing vehicle 96, and the trailer hitch 94 is disposed in the socket 98 formed in the tongue 12 of the trailer 14. Two attachment plates 330 (only one being shown in FIG. 20) are connected to the towing vehicle 96 and positioned on opposite sides of the trailer hitch 94. Two flexible linkages 114 are connected near the upturned lip 50 of the trailer decoupling device 10 such that the connection of the flexible linkages 114 is in close proximity to the pivot point of the trailer tongue 12 on the trailer hitch 94. The opposite ends of the flexible linkages 114 are connected to respective coupling members 250a. Each of the coupling members 250 is attached to a respective attachment plate 330.

The flexible linkages 114 are provided with enough slack so as to permit turning of the towing vehicle 96 and the trailer 14, while also having a length which is sufficiently small so as to prevent engagement of the trailer decoupling prevention device 10 with the ground in the event that the trailer hitch 94 breaks and the tongue 12 is thereby disengaged from the trailer hitch 94. As best shown in FIG. 20, the attachment plates 330 can be disposed on opposite sides of the trailer decoupling prevention device 10 so that the flexible linkages 114 extend in substantially lateral opposite directions and thereby cooperate to prevent the tongue 12 from swinging wildly in the event that the tongue 12 is disengaged from the trailer hitch 94 while the trailer 14 is being towed.

Changes may be made in the construction and the operation of the various components, elements, and assemblies described herein and changes may be made in the steps or the sequence of steps of the methods described herein without departing from the spirit and scope of the invention as defined in the following claims.

What is claimed is:

1. A trailer decoupling prevention device for preventing a trailer from decoupling from a trailer hitch mounted on a towing vehicle, the trailer decoupling prevention device comprising:

a lower plate adapted to be movably supported by at least a portion of the trailer, the lower plate having at least one lug extending from the lower plate, the lug having a transverse hole formed therethrough; and means for selectively permitting movement of the lower plate between a coupled position wherein at least a portion of the lower plate is positioned to prevent the trailer from being removed from the trailer hitch, and an uncoupled position wherein the lower plate is positioned to permit removal of the trailer from the trailer hitch, the means comprising:

a U-shaped bracket having a first side member and a second side member, the first side member and the second side member being spatially disposed to define a cavity in which the lug of the lower plate is positioned and each of the first side member and the second side member having a pair of apertures formed therethrough; and a lower plate stop assembly having a first portion engaging the lower plate to support at least a portion of the lower plate in the cavity of the bracket and a second portion being moveable with respect to the lower plate such that upon movement of the second portion to a first position the lower plate is moveable from the coupled position to the decoupled position, and upon movement of the second portion to a second position the second portion engages the lower plate to prevent movement of the lower plate from the coupled position to the decoupled position.

2. The trailer decoupling prevention device of claim 1 wherein in the coupled position, the lower plate is adapted to be disposed a distance below the trailer hitch of the towing vehicle in a non-engaging relationship with respect to the towing vehicle.

* * * * *